US009264615B2

United States Patent
Takeuchi

(10) Patent No.: US 9,264,615 B2
(45) Date of Patent: Feb. 16, 2016

(54) IMAGE CAPTURING APPARATUS AND CONTROL METHOD THEREOF

(71) Applicant: CANON KABUSHIKI KAISHA, Tokyo (JP)

(72) Inventor: Kenji Takeuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/473,505

(22) Filed: Aug. 29, 2014

(65) Prior Publication Data

US 2015/0062358 A1 Mar. 5, 2015

(30) Foreign Application Priority Data

Sep. 2, 2013 (JP) .................................. 2013-181561

(51) Int. Cl.
H04N 5/232 (2006.01)
(52) U.S. Cl.
CPC ......... H04N 5/23254 (2013.01); H04N 5/2328 (2013.01)
(58) Field of Classification Search
CPC ............ H04N 5/23254; H04N 5/2328; H04N 5/23261
USPC .......... 348/208.1, 208.3, 208.99; 396/55, 421
See application file for complete search history.

(56) References Cited

U.S. PATENT DOCUMENTS

| 5,761,545 A * | 6/1998 | Tanaka | G03B 5/00 348/E5.046 |
| 2007/0009242 A1* | 1/2007 | Okada | G03B 17/00 396/52 |
| 2009/0021589 A1* | 1/2009 | Okada | G03B 5/00 348/208.1 |
| 2009/0231444 A1* | 9/2009 | Shibata | H04N 5/145 348/208.1 |
| 2010/0134639 A1* | 6/2010 | Takeuchi | H04N 5/23248 348/208.4 |
| 2011/0063458 A1* | 3/2011 | Washisu | G03B 17/00 348/208.2 |
| 2011/0115929 A1* | 5/2011 | Noguchi | G03B 5/00 348/208.4 |
| 2013/0147976 A1* | 6/2013 | Noguchi | G03B 5/00 348/208.2 |
| 2014/0125828 A1* | 5/2014 | Takeuchi | H04N 5/2254 348/208.99 |

FOREIGN PATENT DOCUMENTS

| JP | 2006-113264 A | 4/2006 |
| JP | 2010-004370 A | 7/2010 |
| JP | 2011-118073 A | 6/2011 |

* cited by examiner

Primary Examiner — Tuan Ho
Assistant Examiner — Marly Camargo
(74) Attorney, Agent, or Firm — Cowan, Liebowitz & Latman, P.C.

(57) ABSTRACT

An image capturing apparatus determines the target position of a shake correction lens in accordance with a shake signal corresponding to an acting shake, and performs feedback control to converge the position of the shake correction lens to the target position. A division unit divides the shake signal into low- and high-frequency components. A first low-pass filter integrates the high-frequency component, and a second low-pass filter integrates the low-frequency component. A synthesis unit synthesizes output signals from the first and second low-pass filters, and outputs the synthetic signal as the target position. When the apparatus is being panned or tilted, the cutoff frequency of the second low-pass filter is set to be a value larger than that of a cutoff frequency when the apparatus is neither being panned nor tilted.

10 Claims, 7 Drawing Sheets

IMAGE CAPTURING APPARATUS AND CONTROL METHOD THEREOF

BACKGROUND OF THE INVENTION

1. Field of the Invention

The present invention relates to an image capturing apparatus and a control method thereof.

2. Description of the Related Art

In an image captured by an image capturing apparatus such as a digital camera, an object image sometimes blurs when, for example, the hand of a user holding the camera body swings at the time of image capturing to cause a so-called camera shake. Most digital cameras have a function of correcting a blur of an object image that appears on an image capturing screen owing to vibrations acting on the camera body.

Conventionally, optical image blur correction processing and electronic image blur correction processing have been known as image blur correction processing. In optical image blur correction processing, a vibration of the camera body is detected by an angular velocity sensor or the like, and an anti-vibration lens in an imaging optical system is moved to change the optical axis direction of the imaging optical system. Accordingly, an image formed on the light receiving surface of an image sensor is moved to correct the image blur. In electronic image blur correction processing, image processing is performed on a captured image to pseudo-correct an image blur.

A shake signal output from the angular velocity sensor contains, for example, a signal arising from a camera operation intended by the user, such as a panning operation, in addition to a signal arising from a vibration to be corrected, such as a camera shake. If the anti-vibration lens is simply driven based on a shake signal, image blur correction is performed even on a large shake such as a pan or tilt. However, it is not preferable to perform image blur correction processing upon the panning or tilting operation. This is because the anti-vibration lens may exceed a drivable range, or an image swing (swing-back) occurs after panning or tilting, and the camera operation or video becomes unnatural.

To solve this, there is known swing-back correction in which, when it is determined that a shake signal output from the angular velocity sensor arises from the panning or tilting operation, image blur correction is stopped, and the anti-vibration lens is returned to the center (reference position having a displacement amount of 0) of the movable range and is stopped.

At the end of the panning or tilting operation, a shake signal does not become strictly 0, but gradually comes close to 0 owing to, for example, a residual signal from a high-pass filter (HPF) or integrator in a detection signal processing system upon an abrupt change of the angular velocity of the camera. When image blur correction is restarted, the anti-vibration lens greatly moves in accordance with the shake signal, causing a swing-back of an image.

As a technique for preventing the swing-back, Japanese Patent Laid-Open No. 2006-113264 has disclosed image blur correction in which the cutoff frequency of an angular velocity signal processing system filter is changed stepwise at the end of the panning operation. Japanese Patent Laid-Open No. 2011-118073 has disclosed a method of performing velocity control corresponding to the angular velocity for driving of an anti-vibration lens without using an HPF or LPF (integrator) having an ultralow cutoff frequency in an angular velocity signal processing system filter, which serves as the cause of a swing-back. Japanese Patent Laid-Open No. 2010-004370 has disclosed a technique of correcting a shake by a shake correction lens based on a shake signal detected by an angular velocity sensor, and correcting a shake by electronic vibration isolation based on an image blur signal of a low-frequency component. Even if a large shake is generated by the panning or tilting operation or the like, the driving range of the anti-vibration lens can be satisfactorily ensured.

In the method described in Japanese Patent Laid-Open No. 2006-113264, vibration isolation immediately after the panning or tilting operation becomes weak.

In the method described in Japanese Patent Laid-Open No. 2011-118073, the anti-vibration lens is centered by position control at all times other than exposure, and the anti-vibration performance is weakened with respect to the low-frequency component of a shake signal corresponding to a swing of the body or the like. When the offset of the angular velocity sensor or the temperature fluctuation is large, the anti-vibration lens quickly moves away from the center because there is no HPF. Thus, an expensive sensor such as a quartz gyroscope almost free from an offset or temperature fluctuation becomes necessary.

In the method described in Japanese Patent Laid-Open No. 2010-004370, the shake correction performance drops with respect to a low frequency at the time of exposure in which electronic vibration isolation cannot be performed.

SUMMARY OF THE INVENTION

The present invention solves at least one of the above problems, and implements satisfactory image blur correction even when a large shake is generated by the panning or tilting operation or the like.

One aspect of the present invention is directed to an image capturing apparatus comprising a shake correction lens, a detection unit configured to detect a shake of the image capturing apparatus and output a shake signal corresponding to the shake, a determination unit configured to determine a target position of the shake correction lens in accordance with the output shake signal, and a position controller configured to perform feedback control to converge a position of the shake correction lens to the determined target position, wherein the determination unit includes a division unit configured to divide the shake signal into a low-frequency component and a high-frequency component, a first low-pass filter configured to integrate the high-frequency component, a second low-pass filter having a variable cutoff frequency and configured to integrate the low-frequency component, a synthesis unit configured to synthesize an output signal from the first low-pass filter and an output signal from the second low-pass filter, and output the synthetic signal as the target position, a judgment unit configured to judge one of panning and tilting operations of the image capturing apparatus, and a setting unit configured to, when the judgment unit judges that the image capturing apparatus is being panned or tilted, set the cutoff frequency of the second low-pass filter to be a value larger than a value of a cutoff frequency when the image capturing apparatus is neither being panned nor tilted.

Further features of the present invention will become apparent from the following description of exemplary embodiments (with reference to the attached drawings).

DESCRIPTION OF THE EMBODIMENTS

Various exemplary embodiments, features, and aspects of the invention will be described in detail below with reference to the drawings. Note that the following embodiments are not intended to limit the present invention and are merely examples advantageous for practicing the invention. Also, not all combinations of features described in the embodiment are indispensable for the means to solve the problems according to the present invention.

Figure 1:
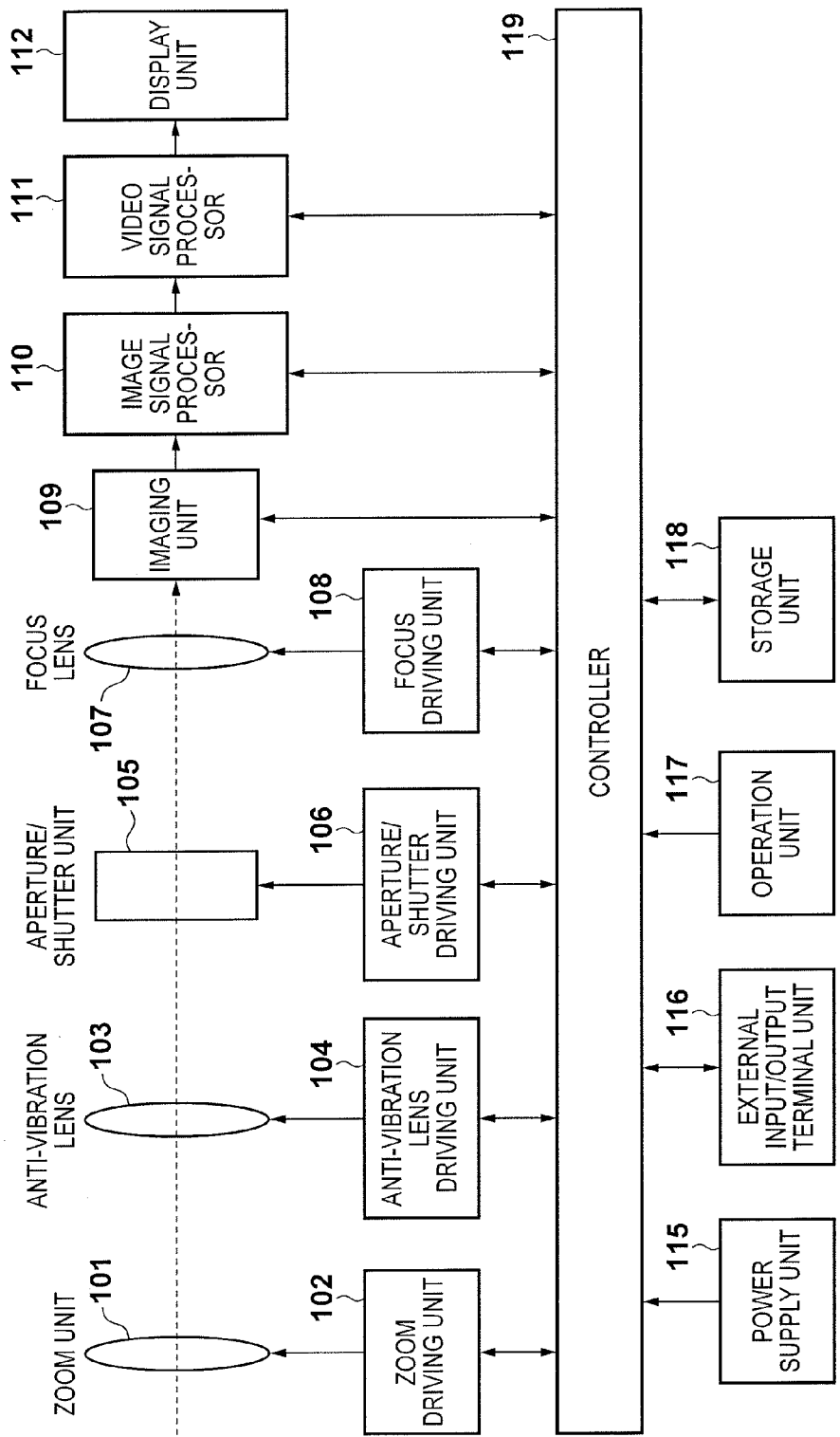
FIG. 1 is a block diagram showing an example of the functional arrangement of an image capturing apparatus according to an embodiment.

FIG. 1 is a block diagram showing an example of the functional arrangement of an image capturing apparatus according to an embodiment of the present invention. In the embodiment, the image capturing apparatus is a digital still camera, but may have a moving image capturing function.

A zoom unit 101 is part of an imaging lens which constitutes an imaging optical system and can change the magnification. The zoom unit 101 includes a zoom lens which changes the magnification of the imaging lens. A zoom driving unit 102 controls driving of the zoom unit 101 under the control of a controller 119. An anti-vibration lens 103 is movable in a direction perpendicular to the optical axis of the imaging lens. An anti-vibration lens driving unit 104 drives the anti-vibration lens 103 under the control of the controller 119.

A aperture/shutter unit 105 is a mechanical shutter having the aperture function. A aperture/shutter driving unit 106 drives the aperture/shutter unit 105 under the control of the controller 119. A focus lens 107 is part of the imaging lens, and is configured so that the position can be changed along the optical axis of the imaging lens. A focus driving unit 108 drives the focus lens 107 under the control of the controller 119.

An imaging unit 109 converts an optical image formed by the imaging lens into an electrical signal of each pixel by using an image sensor such as a CCD image sensor or CMOS image sensor. An image signal processor 110 performs A/D conversion, correlated double sampling, gamma correction, white balance correction, color interpolation processing, and the like on the electrical signal output from the imaging unit 109, and converts the electrical signal into a video signal. A video signal processor 111 processes the video signal output from the image signal processor 110 in accordance with the application purpose. More specifically, the video signal processor 111 generates a video for display, or performs encoding processing and data file processing for recording.

A display unit 112 displays an image, as needed, based on the video signal for display that is output from the video signal processor 111. A power supply unit 115 supplies power to the overall image capturing apparatus in accordance with the application purpose. An external input/output terminal unit 116 receives/outputs a communication signal and video signal from/to an external apparatus. An operation unit 117 includes a button and switch for giving an instruction from the user to the image capturing apparatus. A storage unit 118 stores various data such as video information. The controller 119 includes, for example, a CPU, ROM, and RAM. The controller 119 controls the respective units of the image capturing apparatus by loading, into the RAM, a control program stored in the ROM, and executing it by the CPU. Hence, the controller 119 implements operations in the image capturing apparatus, including various operations to be described later.

The operation unit 117 includes a release button configured to sequentially turn on a first switch SW1 and second switch SW2 in accordance with the pressing amount. When the release button is pressed almost halfway, the release switch SW1 is turned on. When the release button is pressed fully, the release switch SW2 is turned on. When the release switch SW1 is turned on, the controller 119 performs autofocus detection by controlling the focus driving unit 108 in accordance with, for example, an AF evaluation value based on a video signal for display that is output from the video signal processor 111 to the display unit 112. Also, the controller 119 performs AE processing to determine an f-number and shutter speed for obtaining an appropriate exposure amount based on luminance information of a video signal and, for example, a predetermined program chart. When the release switch SW2 is turned on, the controller 119 controls the respective units to capture an image at the determined f-number and shutter speed, and store image data obtained by the imaging unit 109 in the storage unit 118.

The operation unit 117 includes an anti-vibration switch capable of selecting a shake correction (anti-vibration) mode. When the shake correction mode is selected with the anti-vibration switch, the controller 119 instructs the anti-vibration lens driving unit 104 about an anti-vibration operation. Upon receiving this instruction, the anti-vibration lens driving unit 104 performs the anti-vibration operation until it receives an anti-vibration operation stop instruction. The operation unit 117 includes an image capturing mode selection switch capable of selecting either of a still image capturing mode and moving image capturing mode. In each image capturing mode, the operation conditions of the anti-vibration lens driving unit 104 can be changed. The operation unit 117 also includes a playback mode selection switch for selecting a playback mode. In the playback mode, the anti-vibration operation is stopped. The operation unit 117 also includes a magnification change switch for inputting a zoom ratio change instruction. When the user inputs a zoom ratio change instruction via the magnification change switch, the zoom driving unit 102 receives the instruction via the controller 119, and drives the zoom unit 101 to move the zoom unit 101 to the instructed zoom position.

(Arrangement of Anti-Vibration Lens Driving Unit 104)

Figure 2:
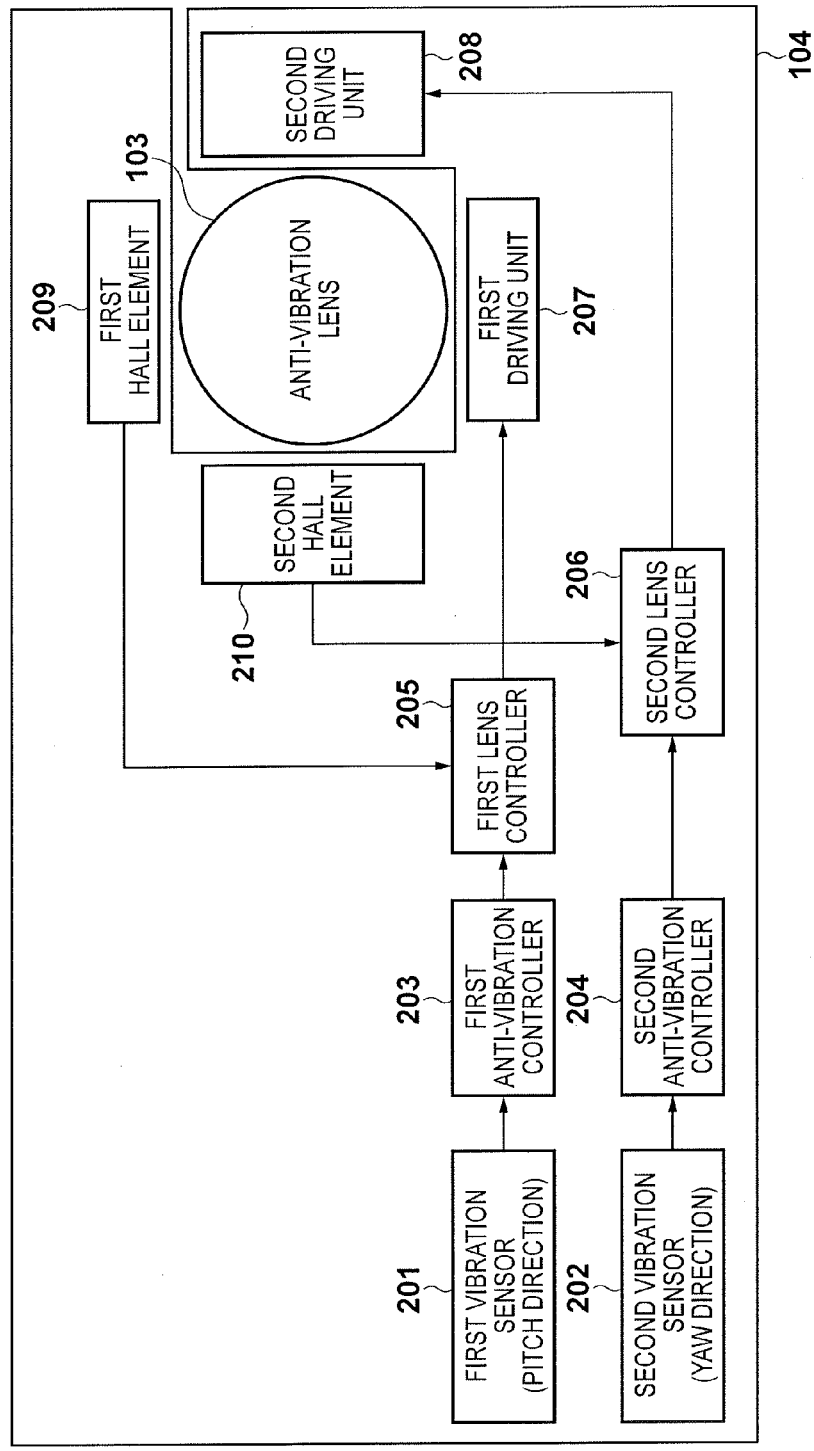
FIG. 2 is a block diagram showing an example of the arrangement of an anti-vibration lens driving unit according to the embodiment.

FIG. 2 is a block diagram showing an example of the functional arrangement of the anti-vibration lens driving unit 104. A first vibration sensor 201 is, for example, an angular velocity sensor, and detects vibrations in the vertical direction (pitch direction) of the image capturing apparatus in a normal orientation (orientation in which the longitudinal direction of an image almost coincides with the horizontal direction). A second vibration sensor 202 is, for example, an angular velocity sensor, and detects vibrations in the horizontal direction (yaw direction) of the image capturing apparatus in the normal orientation. First and second anti-vibration controllers 203 and 204 respectively determine target positions of the anti-vibration lens in the pitch and yaw directions, output correction position control signals regarding the target positions, and control driving of the anti-vibration lens.

By feedback control, a first lens controller 205 drives a first driving unit 207 which is, for example, an actuator. This feedback control is executed based on the correction position control signal in the pitch direction from the first anti-vibration controller 203, and position information of the anti-vibration lens in the pitch direction from a first Hall element 209. Similarly, by feedback control, a second lens controller 206 drives a second driving unit 208 which is, for example, an actuator. This feedback control is executed based on the correction position control signal in the yaw direction from the second anti-vibration controller 204, and position information of the anti-vibration lens in the yaw direction from a second Hall element 210.

(Operation of Anti-Vibration Lens Driving Unit 104)

Next, the driving control operation of the anti-vibration lens 103 by the anti-vibration lens driving unit 104 shown in FIG. 2 will be explained. The first and second vibration sensors 201 and 202 respectively supply, to the first and second anti-vibration controllers 203 and 204, shake signals (angular velocity signals) representing shakes of the image capturing apparatus in the pitch and yaw directions. Based on the supplied shake signals, the first and second anti-vibration controllers 203 and 204 generate correction position control signals for driving the anti-vibration lens 103 in the pitch and yaw directions, and output them to the first and second lens controllers 205 and 206.

The first and second Hall elements 209 and 210 output, as pieces of position information of the anti-vibration lens 103 in the pitch and yaw directions, signals each having a voltage corresponding to the strength of a magnetic field generated by the magnet of the anti-vibration lens 103. The pieces of position information are supplied to the first and second lens controllers 205 and 206. The first and second lens controllers 205 and 206 perform feedback control while driving the first and second driving units 207 and 208 so that signal values (representing positions of the anti-vibration lens) from the first and second Hall elements 209 and 210 converge to the correction position control signal values (representing target positions of the anti-vibration lens) from the first and second anti-vibration controllers 203 and 204.

Note that the position signal values output from the first and second Hall elements 209 and 210 vary. Hence, outputs from the first and second Hall elements 209 and 210 are adjusted to move the anti-vibration lens 103 to a predetermined position in accordance with predetermined correction position control signals.

The first and second anti-vibration controllers 203 and 204 output correction position control signals, respectively, to move the position of the anti-vibration lens 103 so as to cancel an image blur based on pieces of shake information from the first and second vibration sensors 201 and 202. For example, the first and second anti-vibration controllers 203 and 204 can generate correction velocity or correction position control signals based on the pieces of shake information (angular velocity signals), or by performing filter processing or the like on the pieces of shake information.

By the above-described operation, even when a vibration such as a camera shake acts on the image capturing apparatus at the time of image capturing, an image blur can be prevented against a certain degree of vibration. The first and second anti-vibration controllers 203 and 204 detect the panning state of the image capturing apparatus and perform panning control based on pieces of shake information from the first and second vibration sensors 201 and 202, and outputs from the first and second Hall elements 209 and 210.

First Embodiment

Shake Correction Mechanism

Figure 3:
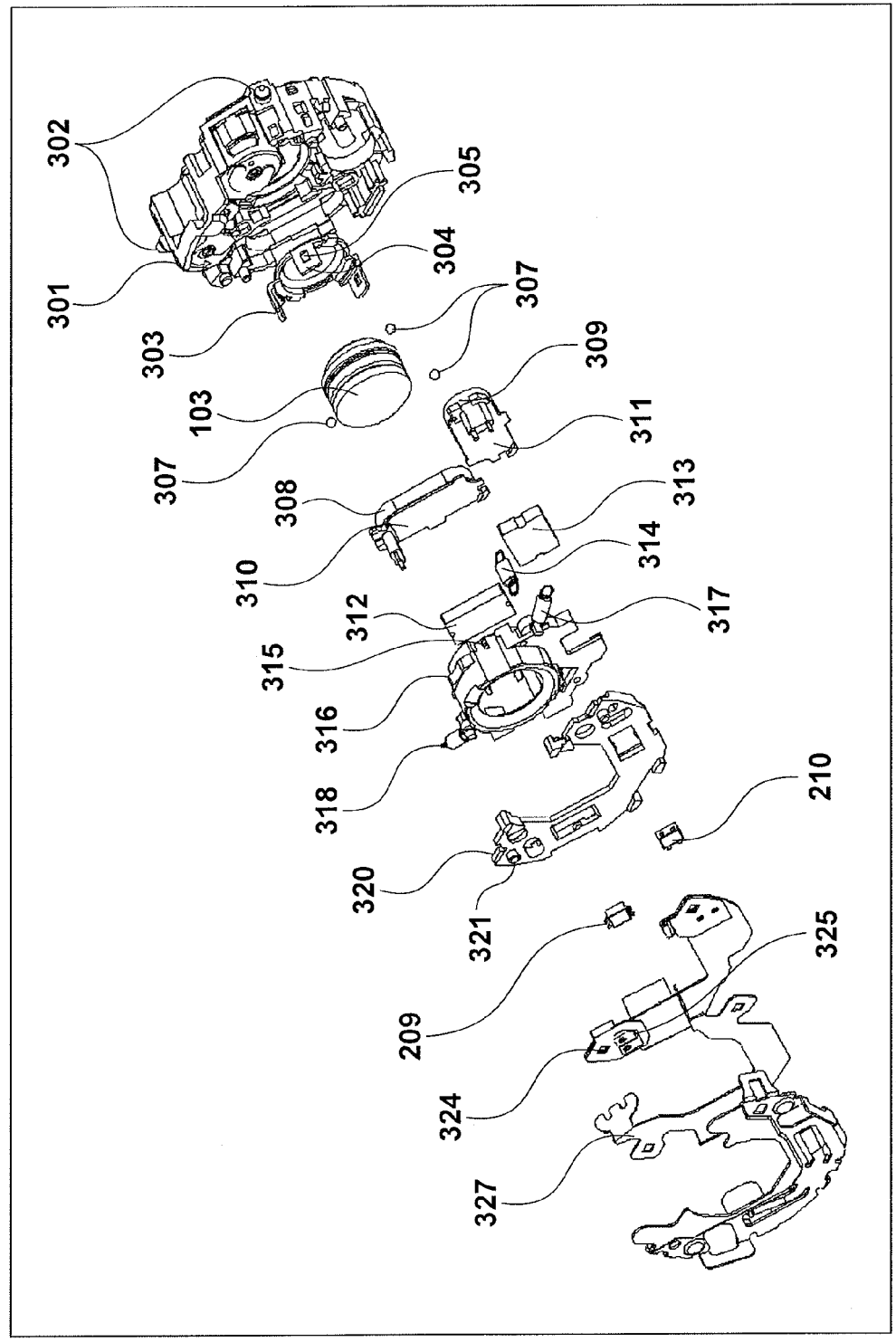
FIG. 3 is an exploded perspective view showing an example of the arrangement of a shake correction mechanism according to the first embodiment.

FIG. 3 is an exploded perspective view showing an example of the detailed arrangement of a shake correction mechanism equivalent to the anti-vibration lens 103, anti-vibration lens driving unit 104, aperture/shutter unit 105, and aperture/shutter driving unit 106.

A base 301 is the base of the shake correction mechanism, and the aperture/shutter unit 105 and an ND filter mechanism are also fixed to the base 301. Two follower pins 302 shown in FIG. 3, and a movable follower pin (not shown) are integrally formed on the base 301. These three follower pins are fitted in three cam grooves of a cam cylinder (not shown) outside the base 301 in the radial direction, and reciprocate along the cam grooves in the optical axis direction.

A holder 316 holds the anti-vibration lens 103 using a caulking claw (not shown). A lens cover 303 has an opening which restricts a beam passing through the anti-vibration lens 103. Openings 305 are respectively formed in three arms 304 extending along the side surface. Projections 315 formed at three portions on the side surface of the holder 316 are fitted in the openings 305, integrally holding the lens cover 303 by the holder 316. The holder 316 integrally holds magnets 312 and 313 mentioned above.

The holder 316 is brought into press contact with the base 301 via three balls 307, and can move in an arbitrary direction within a plane perpendicular to the optical axis as the balls 307 roll. The arrangement in which the balls 307 hold the holder 316 can implement shorter-cycle vibrations with smaller amplitude than by an arrangement in which a guide bar guides a holder. Satisfactory correction can therefore be achieved even in an image capturing apparatus including an image sensor of many pixels.

A thrust spring 314 is engaged at one end with the projection 315 of the holder 316, and at the other end with a projection (not shown) of the base 301. The thrust spring 314 is held while being stretched, and biases the holder 316 toward the base 301. Radial springs 317 and 318 prevent rotation of the holder 316.

Metal pins are integrally formed at the distal ends of resin bobbins 310 and 311, and the ends of coils 308 and 309 are tied. On a flexible board (FPC) 324, a land 325 is electrically connected to the pins of the bobbins 310 and 311 by soldering or the like, and forms a circuit which supplies power to the coils 308 and 309.

The first and second Hall elements 209 and 210 are arranged near the magnets 312 and 313, and detect magnetic fields generated by the magnets 312 and 313. The first and second Hall elements 209 and 210 are mounted on the FPC 324, and receive power via the FPC 324.

An FPC 327 forms a circuit which supplies power to the aperture/shutter unit 105 and an ND filter driving unit. The FPCs 324 and 327 are fixed to a holder 320 via a projection 321.

(Arrangements of Anti-Vibration Controller and Lens Controller)

Figure 4:
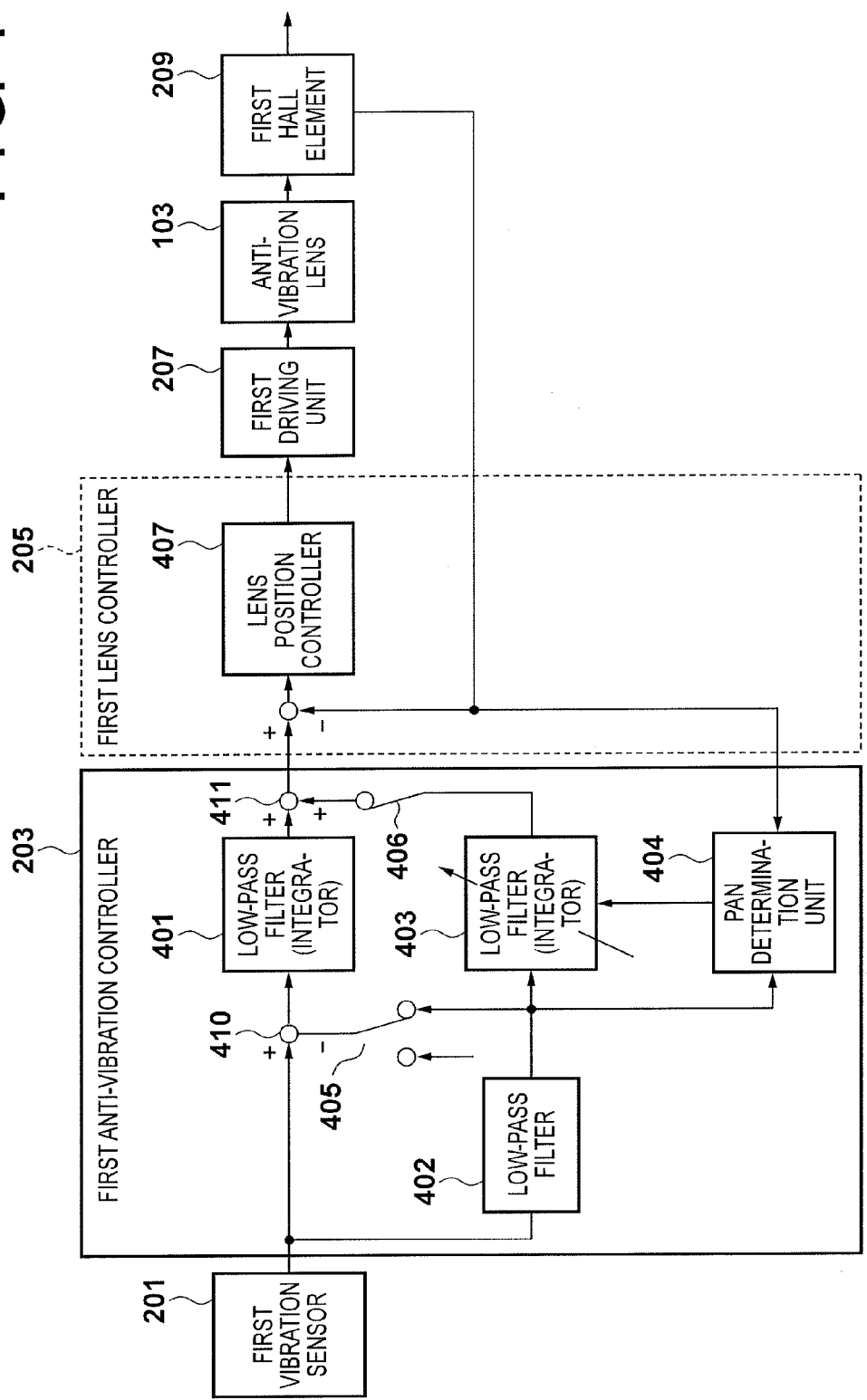
FIG. 4 is a block diagram showing the internal arrangements of an anti-vibration controller and lens controller according to the first embodiment.

FIG. 4 is a block diagram showing the internal arrangements of the first anti-vibration controller 203 and first lens controller 205. Note that the second anti-vibration controller 204 and second lens controller 206 also have the same internal arrangements as those of the first anti-vibration controller 203 and first lens controller 205, so a description of the second anti-vibration controller 204 and second lens controller 206 will be omitted.

In FIG. 4, the first vibration sensor 201 detects a shake acting on the image capturing apparatus, and outputs a shake signal (angular velocity signal) corresponding to the shake. An LPF 402 extracts a low-frequency component from the shake signal output from the vibration sensor 201. A subtractor 410 subtracts, from the shake signal output from the vibration sensor 201, the low-frequency component extracted by the LPF 402, thereby acquiring the high-frequency component of the shake signal. More specifically, in the embodiment, the LPF 402 and subtractor 410 constitute a division unit which divides a shake signal into a low-frequency component and high-frequency component. An LPF 401 (first low-pass filter) integrates the acquired high-frequency component of the shake signal. By integrating the high-frequency component of the shake signal by the LPF 401, angular velocity information is converted into angle information, generating a shake angle signal in which only the high-frequency component has been extracted. In contrast, an LPF 403 (second low-pass filter) having a variable cutoff frequency similarly integrates the low-frequency component of the shake signal that has been extracted by the LPF 402, generating a shake angle signal in which only the low-frequency component has been extracted. In the following cases, a pan determination unit 404 determines that the image capturing apparatus is being panned or tilted:

(1) a case in which the image capturing apparatus is greatly shaken by the panning or tilting operation, and a low-frequency component extracted by the LPF 402 (third low-pass filter) exceeds a predetermined value; and
(2) a case in which the anti-vibration lens position greatly deviates from the center position of the lens.

Upon receiving the determination result of the pan determination unit 404, the LPF 403 sets the cutoff frequency of the LPF 403 to be a large value. When a large shake acts on the image capturing apparatus, this processing prevents driving of the anti-vibration lens by more than a movable range, and prevents a captured image from becoming unstable owing to a swing-back immediately after the panning operation.

The generated low- and high-frequency shake angle signals of the shake signal are synthesized, and the synthetic signal is input as an anti-vibration lens target position to a lens position controller 407. The lens position controller 407 executes an anti-vibration operation by feedback control of position information detected by the Hall element 209 with respect to the anti-vibration lens target position. The lens position controller 407 can be constructed using an arbitrary control arithmetic unit, and adopts, for example, PID control.

A switch 405 switches whether to keep updating the output value of the LPF 402 or output a predetermined value when the output of the LPF 403 is subtracted from the output of the vibration sensor 201 and then is input to the LPF 401. A switch 406 switches whether to input, as the anti-vibration lens target position to the first lens controller 205, a camera shake angle signal in which only a low frequency calculated by the LPF 403 has been extracted.

Figure 6:
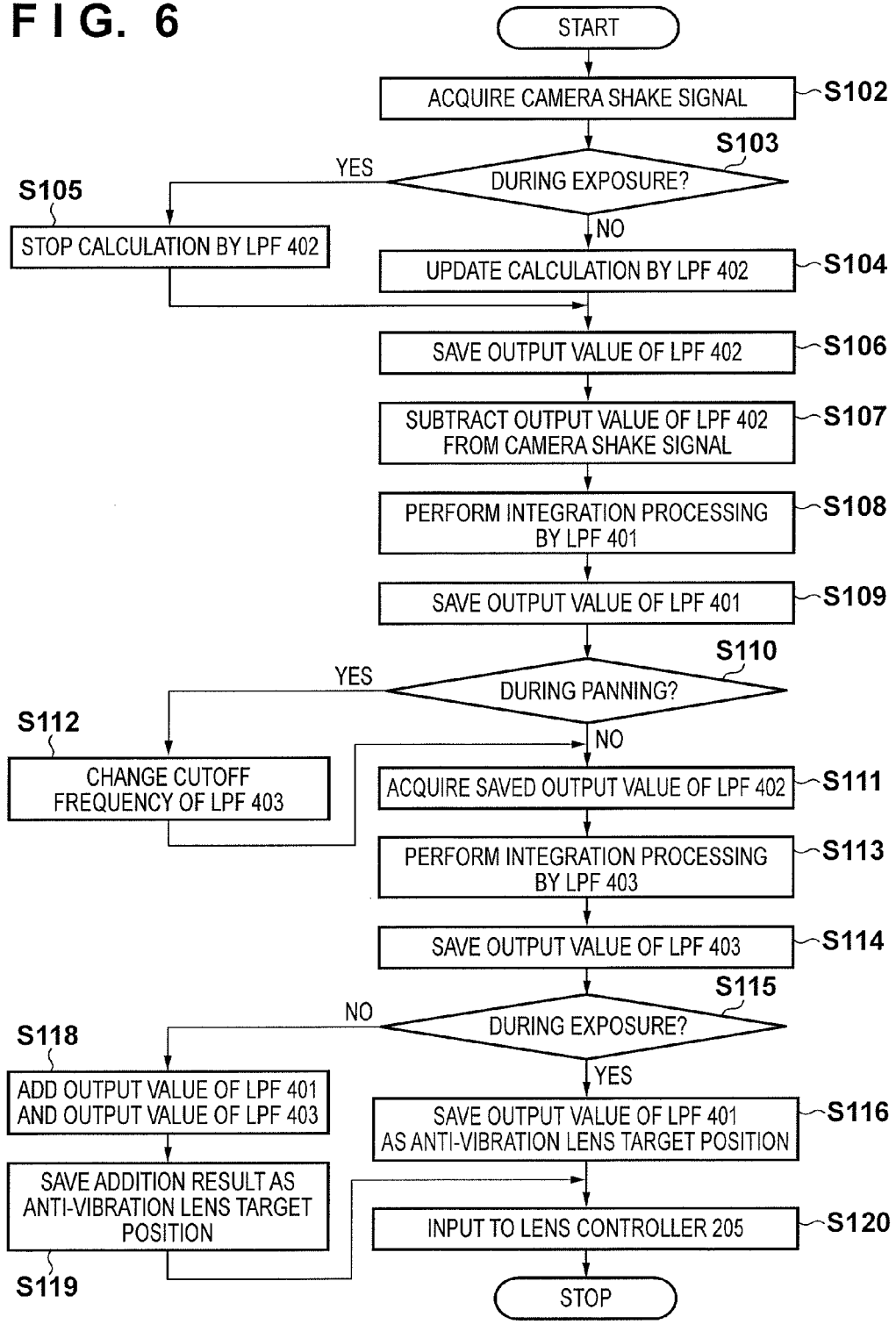
FIG. 6 is a flowchart showing processing by the anti-vibration controller according to the first embodiment.

An anti-vibration lens control method to be performed in the image capturing apparatus having the above-described arrangement will be explained with reference to FIG. 6. FIG. 6 is a flowchart showing anti-vibration processing to be performed in the image capturing apparatus.

Anti-vibration control calculation is executed at a predetermined periodical interval. First, a shake signal is acquired from the first vibration sensor 201 (step S102), and it is determined whether exposure is being performed (step S103). If exposure is not being performed, calculation by the LPF 402 is performed to divide the frequency band of the shake signal (step S104), and the calculation result is saved as the low-frequency component of the shake signal in a buffer (step S106). If exposure is being performed, the calculation by the LPF 402 is stopped (step S105). Then, the low-frequency component of the camera shake calculated by the LPF 402 is subtracted from the shake signal to extract a high-frequency component (step S107). In this way, the LPF 402 divides the shake signal into low- and high-frequency components at a set cutoff frequency. The high-frequency component of the camera shake that has been extracted in step S107 is integrated by the LPF 401, and converted from an angular velocity signal into an angle signal (step S108). The obtained angle signal is saved in the buffer (step S109).

Thereafter, the pan determination unit 404 determines whether the image capturing apparatus is being panned (step S110). If the pan determination unit 404 determines that the image capturing apparatus is being panned, the cutoff frequency of the LPF 403 is changed to a higher frequency side, compared to a case in which the image capturing apparatus stands still (step S112). If the pan determination unit 404 determines that the image capturing apparatus is not being panned, the cutoff frequency of the LPF 403 is set to be a predetermined cutoff frequency in the standstill state.

The low-frequency component of the camera shake that has been saved in the buffer in step S106 is read out (step S111). The readout signal is integrated by the LPF 403 in step S113, converted from angular velocity information into angle information, and saved in the buffer (step S114). Then, it is determined whether exposure is being performed (step S115). If exposure is not being performed, the low- and high-frequency components of the angle information of the camera shake that have been saved in the buffer in steps S109 and S114 are added (step S118). The addition result is output as an anti-vibration lens target position (step S119). If exposure is being performed, the low-frequency component (output value of the LPF 401) of the angle information of the camera shake that has been saved in the step S109 is directly output as an anti-vibration lens target position (step S116). The output anti-vibration lens target position is input to the first lens controller 205 (step S120).

By performing feedback control so that the anti-vibration lens position follows the calculated lens target position, the influence of a camera shake acting on the image capturing apparatus is removed. The cutoff frequency of the LPF 402 which divides a shake signal by the frequency is determined so that a signal in the high-frequency band contains a frequency band in which the influence of a camera shake is serious. For example, when many shake signals are contained at a frequency of about 3 Hz to 5 Hz, the cutoff frequency is set to be equal to or lower than at least 3 Hz.

In the embodiment, a shake signal is divided into low and high frequencies, and the respective signals separately undergo signal processing and are added. The resultant signal is used as an anti-vibration lens target position. Processing of attenuating a shake signal, such as change of the cutoff frequency of the integration LPF, is performed on only a low-frequency-side shake signal containing a frequency component at which vibration isolation is not to be performed, such as panning. This is one characteristic processing of the embodiment. If processing of attenuating a signal to prevent the anti-vibration lens from following an unnecessary signal other than a camera shake, such as panning, is applied without dividing a shake signal into frequencies, as in a conventional technique, this degrades even the anti-vibration performance originally necessary for a frequency at which the influence of a camera shake is serious. In the embodiment, a high-frequency-side signal in which processing against panning is not performed covers a frequency band containing many camera shakes, and the remaining low-frequency signal is attenuated. Therefore, correction against a camera shake is not deteriorated even during panning and immediately after panning, and the influence of a swing-back of a captured image by panning can be removed.

If it is determined in step S103 that exposure is being performed, calculation by the LPF 402 is stopped not to update an output from the LPF 402. When saving the output value of the LPF 402 in step S106, a value immediately before exposure in which calculation by the LPF 402 is stopped is directly held without updating it. In step S107, the output signal of the LPF 402 immediately before exposure is subtracted from the shake signal to remove only the DC offset component of the signal sensor, instead of dividing the frequency of the shake signal. If it is determined in step S115 that exposure is being performed, only the output value of the LPF 401 is set as an anti-vibration lens target in step S116. During the exposure period, anti-vibration control can be performed based on a shake signal from which only the DC component has been removed without removing a low-frequency component. In this fashion, processing is changed during exposure. Even when a shake signal is generated at a relatively low frequency owing to a shake of the body or the like in long-exposure shooting or the like, vibration isolation can be performed up to the low frequency. The shake correction effect can be enhanced even under a condition disadvantageous to a camera shake, such as long-exposure shooting.

Second Embodiment

Figure 5:
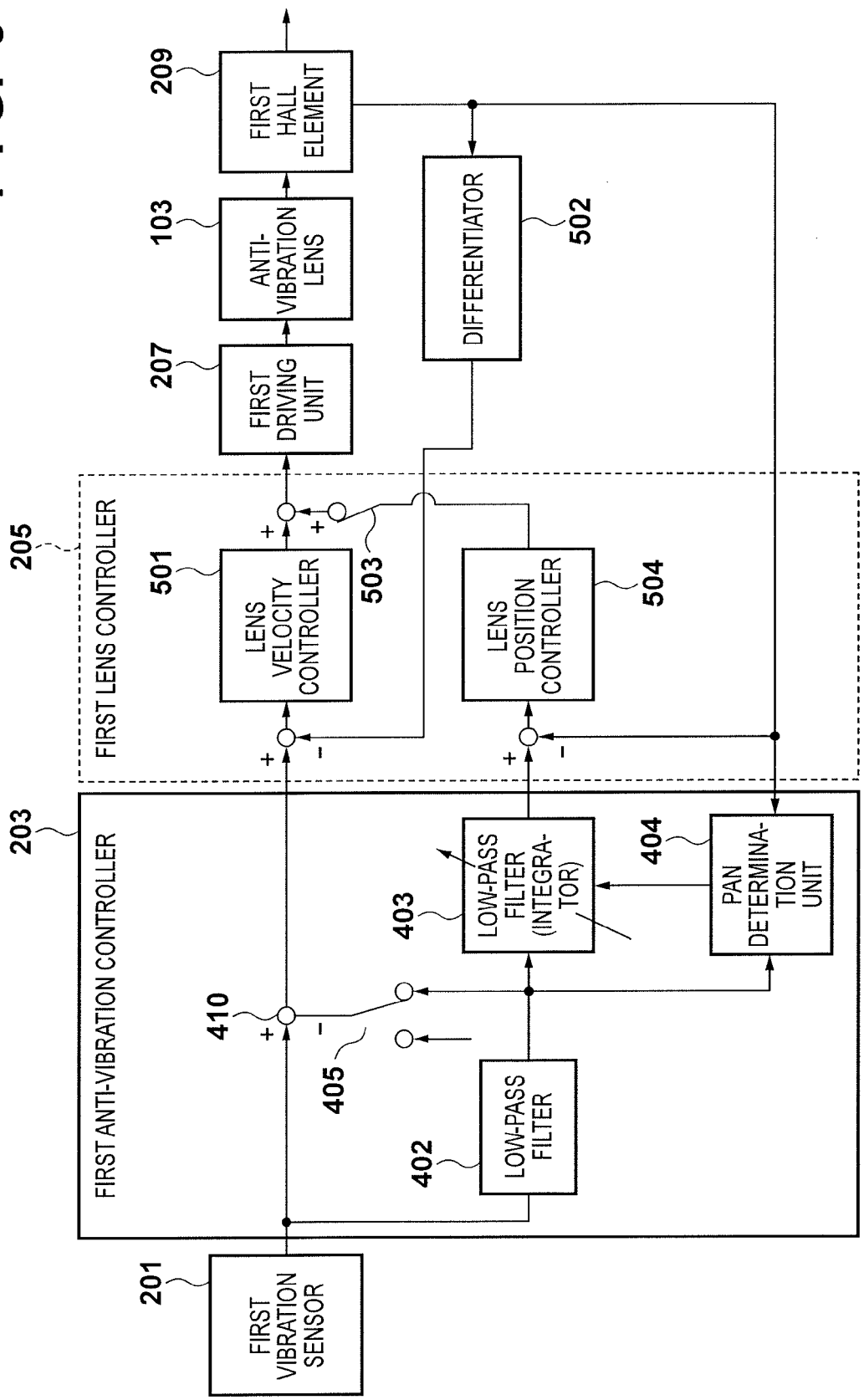
FIG. 5 is a block diagram showing the internal arrangements of an anti-vibration controller and lens controller according to the second embodiment.
Figure 7:
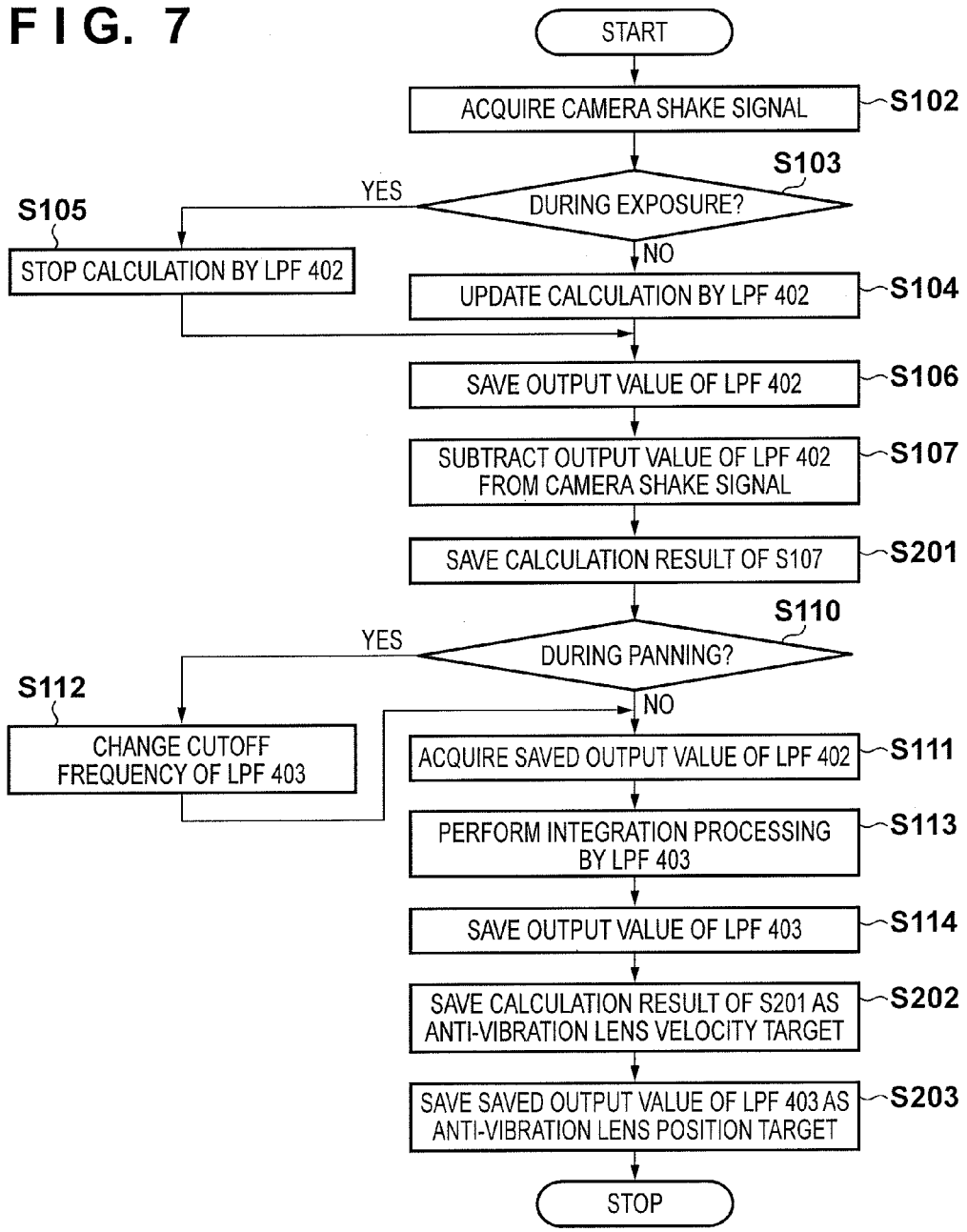
FIG. 7 is a flowchart showing processing by the anti-vibration controller according to the second embodiment.

FIG. 5 is a block diagram showing the internal arrangements of a first anti-vibration controller 203 and first lens controller 205 according to the second embodiment. FIG. 7 is a flowchart showing anti-vibration processing to be performed in an image capturing apparatus according to the second embodiment. Only a difference from the first embodiment will be explained.

In the arrangement of FIG. 5, neither the LPF 401 nor switch 406 exists in the anti-vibration controller 203. The arrangement of FIG. 5 additionally includes a differentiator 502 for calculating a lens velocity by differentiating a signal from a first Hall element 209 configured to detect an anti-vibration lens position. Further, the arrangement of FIG. 5 additionally includes a lens velocity controller 501. The lens velocity controller 501 controls the lens to follow a signal (angular velocity) of a high-frequency component extracted by subtracting a lens velocity calculated by the differentiator 502 from a shake signal detected by a vibration sensor 201. Further, a switch 503 is added to select whether to add, to a controlled variable to be input to a first driving unit 207, a controlled variable calculated by a lens position controller 504.

In FIG. 7, a low-frequency component calculated by an LPF 402 is subtracted from a shake signal (step S107), extracting the high-frequency component of the shake signal. The calculation result is not integrated, unlike step S108 of the first embodiment, but is saved in a buffer (step S201). The low-frequency component of the shake signal is integrated in step S113 and saved in the buffer in step S114. As for an anti-vibration target calculated by division into low and high frequencies, the high-frequency component is controlled as the lens target velocity of the velocity controller 501 (step S202), and the low-frequency component is controlled as the lens target position of the position controller 504 (step S203).

During exposure, calculation of an LPF 403 for extracting a low frequency from a shake signal is stopped, as in the first embodiment. As a result, a signal from which only the DC offset component has been removed from the shake signal is input to the velocity controller. By turning off the switch 503 during exposure, the lens can follow only the target velocity without feeding back the lens position.

The embodiment has an advantage in which an LPF for integration need not be used on a high-frequency path side extracted from a shake signal. Since no integration LPF is used, the influence of a calculation error in LPF calculation and the influence of a swing-back under the influence of the cutoff frequency of the LPF can be reduced more effectively.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-181561, filed Sep. 2, 2013, which is hereby incorporated by reference herein in its entirety.

What is claimed is:
1. An image capturing apparatus comprising:
a shake correction lens;
a detection unit configured to detect a shake of the image capturing apparatus and output a shake signal corresponding to the shake;
a determination unit configured to determine a target position of said shake correction lens in accordance with the output shake signal; and
a position controller configured to perform feedback control to converge a position of said shake correction lens to the determined target position,
wherein said determination unit includes:
a division unit configured to divide the shake signal into a low-frequency component and a high-frequency component;
a first low-pass filter configured to integrate the high-frequency component;
a second low-pass filter having a variable cutoff frequency and configured to integrate the low-frequency component;

a synthesis unit configured to synthesize an output signal from the first low-pass filter and an output signal from the second low-pass filter, and output the synthetic signal as the target position;

a judgment unit configured to judge one of panning and tilting operations of the image capturing apparatus; and a setting unit configured to, when the judgment unit judges that the image capturing apparatus is being panned or tilted, set the cutoff frequency of the second low-pass filter to be a value larger than a value of a cutoff frequency when the image capturing apparatus is neither being panned nor tilted.

2. The apparatus according to claim 1, wherein the division unit includes:

a third low-pass filter configured to extract the low-frequency component; and a subtractor configured to subtract, from the shake signal, the low-frequency component extracted by the third low-pass filter, thereby acquiring the high-frequency component.

3. The apparatus according to claim 2, wherein when the image capturing apparatus is performing exposure, calculation by the third low-pass filter is stopped not to update an output from the third low-pass filter.

4. The apparatus according to claim 1, wherein when the image capturing apparatus is performing exposure, the synthesis unit directly outputs the output signal from the first low-pass filter as the target position.

5. An image capturing apparatus comprising:

a shake correction lens;

a detection unit configured to detect a shake of the image capturing apparatus and output a shake signal corresponding to the shake;

a determination unit configured to determine a target position and target velocity of said shake correction lens in accordance with the output shake signal;

a position controller configured to perform feedback control to converge a position of said shake correction lens to the determined target position; and a velocity controller configured to perform feedback control to converge a velocity of said shake correction lens to the determined target velocity, wherein said determination unit includes:

a division unit configured to divide the shake signal into a low-frequency component and a high-frequency component, and output the high-frequency component as the target velocity to said velocity controller;

a second low-pass filter having a variable cutoff frequency and configured to integrate the low-frequency component and output the low-frequency component as the target position to said position controller;

a judgment unit configured to judge one of panning and tilting operations of the image capturing apparatus; and a setting unit configured to, when the judgment unit judges that the image capturing apparatus is being panned or tilted, set the cutoff frequency of the second low-pass filter to be a value larger than a value of a cutoff frequency when the image capturing apparatus is neither being panned nor tilted.

6. The apparatus according to claim 5, wherein the division unit includes:

a third low-pass filter configured to extract the low-frequency component; and a subtractor configured to subtract, from the shake signal, the low-frequency component extracted by the third low-pass filter, thereby acquiring the high-frequency component.

7. The apparatus according to claim 6, wherein when the image capturing apparatus is performing exposure, calculation by the third low-pass filter is stopped not to update an output from the third low-pass filter.

8. A method of controlling an image capturing apparatus including a shake correction lens, comprising:

a detection step of detecting a shake of the image capturing apparatus and outputting a shake signal corresponding to the shake;

a determination step of determining a target position of the shake correction lens in accordance with the output shake signal; and a position control step of performing feedback control to converge a position of the shake correction lens to the determined target position, wherein the determination step includes:

a step of dividing the shake signal into a low-frequency component and a high-frequency component;

a step of integrating the high-frequency component by a first low-pass filter;

a step of integrating the low-frequency component by a second low-pass filter having a variable cutoff frequency;

a step of synthesizing an output signal from the first low-pass filter and an output signal from the second low-pass filter, and outputting the synthetic signal as the target position;

a judgment step of judging one of panning and tilting operations of the image capturing apparatus; and a step of, when the image capturing apparatus is judged in the judgment step to be being panned or tilted, setting the cutoff frequency of the second low-pass filter to be a value larger than a value of a cutoff frequency when the image capturing apparatus is neither being panned nor tilted.

9. A method of controlling an image capturing apparatus including a shake correction lens, comprising the steps of:

detecting a shake of the image capturing apparatus by a detection unit to output a shake signal corresponding to the shake;

determining a target position and target velocity of the shake correction lens by a determination unit in accordance with the output shake signal;

performing feedback control to converge a position of the shake correction lens to the determined target position by a position controller; and performing feedback control to converge a velocity of the shake correction lens to the determined target velocity by a velocity controller, wherein the determining step includes:

a step of dividing the shake signal into a low-frequency component and a high-frequency component, and outputting the high-frequency component as the target velocity to the velocity controller;

a step of integrating the low-frequency component by a second low-pass filter having a variable cutoff frequency, and outputting the low-frequency component as the target position to the position controller;

a judgment step of judging one of panning and tilting operations of the image capturing apparatus; and a step of, when the image capturing apparatus is judged to be being panned or tilted, setting the cutoff frequency of the second low-pass filter to be a value larger than a value of a cutoff frequency when the image capturing apparatus is neither being panned nor tilted.

10. A non-transitory computer-readable storage medium storing a program for causing a computer to execute each step of a method defined in claim 8.

* * * * *